Patented June 25, 1929.

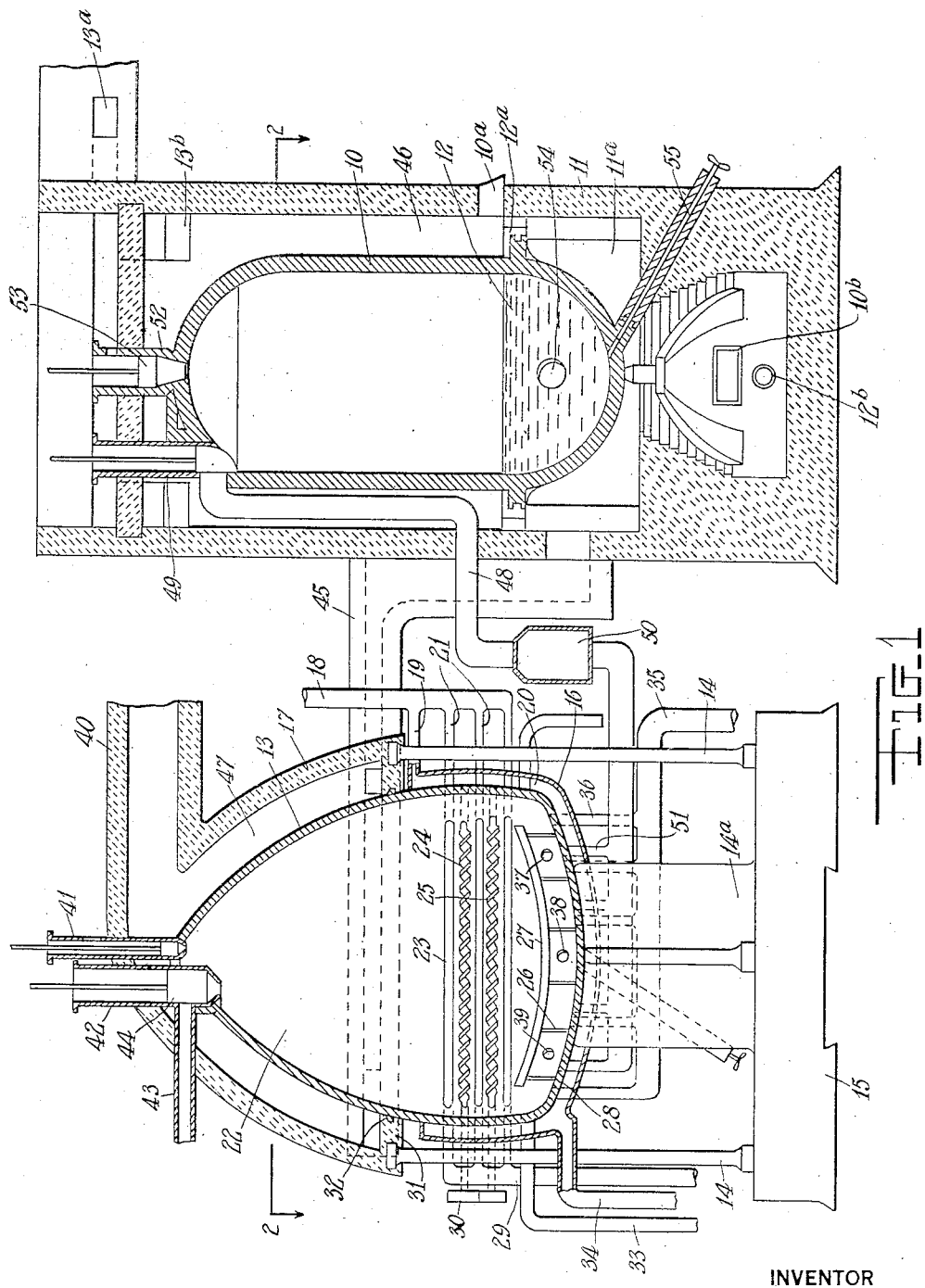

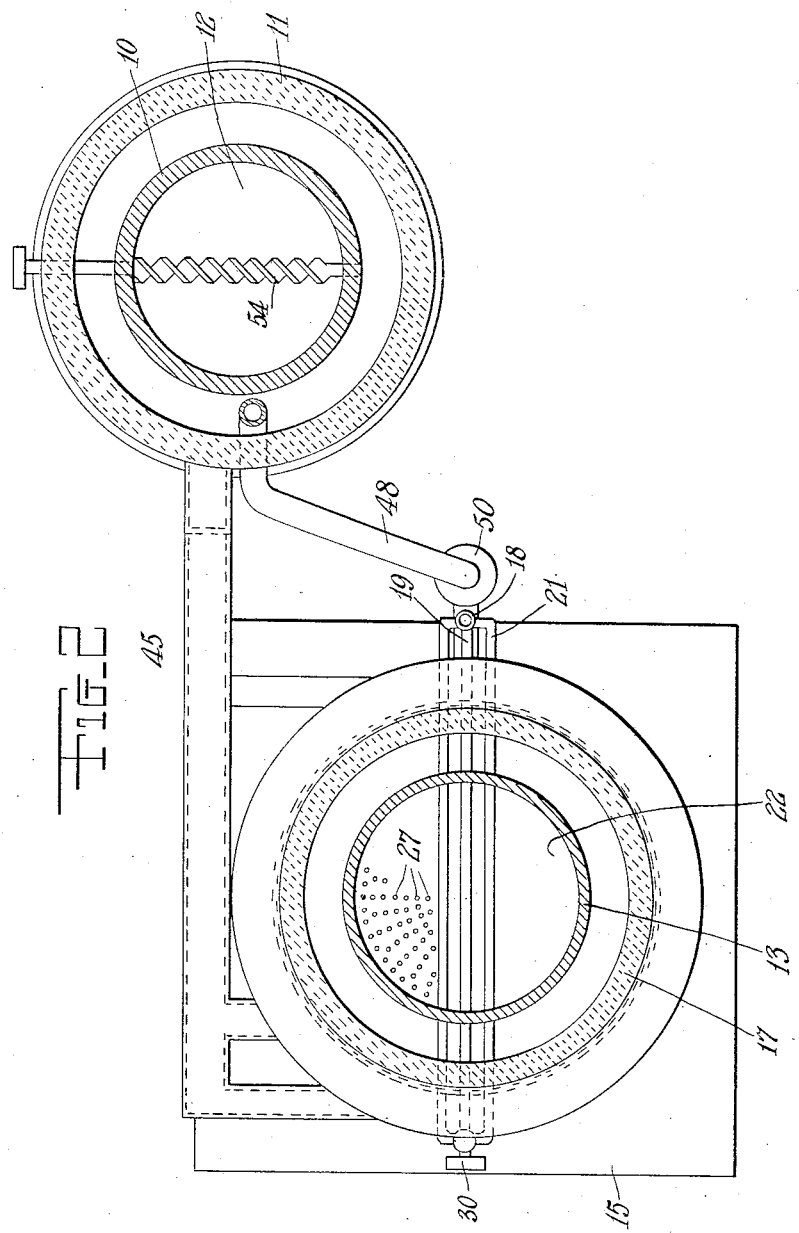

1,718,420

UNITED STATES PATENT OFFICE.

JACOB KESSLER, OF NEW YORK, N. Y.

PROCESS OF CONVERTING AMMONIUM CHLORIDE INTO AMMONIA AND HYDROCHLORIC ACID.

Application filed May 18, 1926. Serial No. 109,850.

The main object of this invention is to eliminate the waste of the chlorine content in the ammonium chloride liquor of the ammonia-soda process. In the previous processes, in apparatus for recovering the ammonia from the ammonium chloride liquors of the ammonia-soda process, lime has been extensively used, and, thru its use, certain disadvantages have been had. This process eliminates the use of lime or other like substances in recovering the ammonia from the ammonium chloride liquors in the ammonia-soda process. The apparatus utilizes a battery of retorts, one of which receives ammonium chloride for volatilization thru the direction of heat, and these vapors when heated to a temperature of 400 to 450 degrees C. are passed thru fused ammonium bisulphate or sodium bisulphate or other useful chemical of similar properties in another retort while the temperature of the fused mass is maintained as near 200 degrees C. as possible.

The above and other objects will become apparent in the description below, in which characters of reference refer to like-named parts in the drawing.

Referring briefly to the drawing, Figure 1 is a longitudinal sectional elevational view thru the apparatus.

Figure 2 is a sectional plan view taken on line 2—2 of Figure 1.

Referring in detail to the drawing, the numeral 10 indicates an iron cylinder in which ammonium chloride is stored. This cylinder serves as a retort and is supported in a housing 11 which serves as the heating chamber and completely encloses the cylinder. In the process, a quantity of fused zinc chloride 12 is stored in the cylinder. Adjacent to the cylinder, an additional substantially ellipsoidal retort 13 is mounted on stand rods 14 which latter are supported on a base 15. The lower half of the retort 13 is encased by a housing 16 and the upper half is encased by an additional housing 17 which is formed of some refractory material. These housings circularly envelop the retort 13 and are closed from each other so that individual access is had to each. Communication with the housing 16 is had thru a pipe 18 which has a number of branch outlets, one of which indicated by the numeral 19, enters into the chamber 20 encircling the periphery of the retort 13 and its bottom. The remaining branches 21 pass thru the wall of the housing 16 thru the chamber 20, pierce the wall of the retort 13, and extend into the chamber 22 of the retort as a plurality of circulating pipes 23 which are grouped about a number of agitator worms 24 and 25. A plurality of studs or legs 26 support a concave perforated table 27 in raised position above the bottom 28 of the retort 13 within the chamber 22. The opposite ends of the circular pipes 23 pass diametrically thru the retort chamber 22 and emerge therefrom thru a manifold drain pipe 29. The worms 24 and 25 are rotated thru the medium of intermeshed gears 30 which are mounted rigidly upon the externally projecting ends of the shanks of said worms. The stand rods 14 are embedded in the floor 31 of the housing 17 and the retort 13 has an encircling flange 32 embedded in the floor 31 of the housing 17 and the entire structure is supported on a pedestal 14ª, the stand rods merely aiding in balancing the entire structure and also support the housing 17 in cooperation with the encircling flange 32. Steam pipes 33 pierce the wall of the retort 13 and communicate with the chamber 22 of said retort for delivering counter jets of steam into the chamber 22 at a temperature between 100 to 250 degrees C. The numeral 34 indicates a tube which joins the housing 16, communicates with the chamber 20, and serves as an outlet member. The numeral 35 indicates a pipe line which has a plurality of branches 36 communicating with the chamber 22 and delivers steam to this chamber at a temperature between 400 and 450 degrees C. Additional rotating agitator worms 37, 38, and 39, are rotatably mounted in the chamber 22 of the retort 13 and aid in stirring up the contents of this retort. The housing 17 has a flue outlet 40 at its upper end which exhausts into the atmosphere. A valve 42 and a valve hopper 41 form part of the design and communicate with the chamber 22 and the valve 42 is provided with a by-pass 43 which is uncovered by a plunger 44 when the latter is lifted. The valve hopper is normally closed and opened to permit the introduction of chemicals used in the process. The housing 11, which encloses the retort 10, is joined to the housing 17 by a conduit 45 which delivers the flue gases from the chamber 46 encircling the retort 10, to the chamber 47 formed by the housing 17 around the upper half of the retort 13. A pipe line 48 communicates with the retort 10 and at the point of juncture between the retort 10 and the pipe line 48, a valve 49, which opens and closes communication between the retort 10 and this pipe line, is mounted. A regulator vent 10ª is formed in the wall 11 for flue gas temperature control. A pump structure 50, illustrated diagrammatically, is mounted intermediate the length of the pipe line 48 and the end of said pipe line, which extends from this pump apparatus, divides into branch pipes 51 which enter into the chamber 22. A relatively small hopper 52, which is provided with a closure plunger 53, is mounted above the retort 10 and communicates with the latter. A conduit 13ª is provided for the purpose of exhausting the gases within member 11. This conduit communicates with the chamber 46 surrounding the retort 10 thru openings 13ᵇ. Said hopper 52 serves as a medium thru which ammonium chloride and zinc chloride are supplied to the retort 10. The retort 10 is also provided with a worm 54 and its bottom has a draining valve 55 which is opened when cleaning the retort 10 of any sediment or remaining content after the process has been completed. The retort 10 is principally supported on stanchions 11ª and in part by an annular ring 12ª.

In the process, zinc chloride 12 is contained in a suitable vessel or retort such as indicated by the numeral 10. This retort is of any durable material, such as ferro-silicon of high silicon content, about 17 to 18% silicon. This zinc chloride is kept heated with producer gas which permeates the chamber 46 and entirely envelops the retort 10. The gas is held at a temperature of 400 to 450 degrees C. which is regulated thru the vent 10ª. When this temperature is attained, solid ammonium chloride is dropped in suitable quantities or continuously into the fused and heated zinc chloride thru the hopper 52. The ammonium chloride then readily volatilizes, especially after the mass is agitated by a convenient form of agitator, such as is indicated by the worm 54. A support 14ª is mounted on a base beneath retort 13 and supports the latter.

At the time that the zinc chloride is being heated in the chamber of the retort 10, the bisulphate, used in the process, is heated in the chamber 22 of the retort 13 to a temperature of between 160 to 170 degrees C. by the passage of superheated steam at 250 to 300 degrees C. thru steam jets and by heated air which courses thru the pipes 18, 21, and 23, these latter circulating out of the chamber 22 thru the pipe 29. The chamber 20 also provides a passage for the circulation of heated air which enters this chamber 20 thru a branch pipe 19 connected to the pipe 18 and is exhausted thru the pipe 34. The material of construction of the bisulphate retort 13 is also of some suitable substance such as ferrosilicon having a similar content as stated for the retort 10. When the desired temperature of the bisulphate mass in retort 13 is attained, that is, a temperature of 160 to 170 degrees C., then the source of heat used in fusing the bisulphate is removed by closing the passage of superheated steam thru the stem jets and of heated air thru the pipe 23 and chamber 20. The ammonium chloride in hopper 52 is at this time fed or delivered into the chamber or retort 10 to the zinc chloride in chamber 10 and the vapors of the ammonium chloride formed in this chamber are guided into the chamber 22 of the retort 13 thru the pipe line 48. Pipes 12ᵇ enter a chamber formed beneath the retort 10 and are adapted to serve as an entrance for air and producer gas and the numeral 10ᵇ indicates a manhole which may be opened or closed as desired when the apparatus is in use.

The ammonium chloride vapors issuing from the fused zinc chloride mass are prevented from condensing on the inner walls of the retort 10 by keeping the temperature of the entire chamber between 400 and 450 degrees C. The vapors of ammonium chloride enter the pipe line 48 into the pumping apparatus 50 and thence pass under pressure thru the branch pipes 51 which are of ferrosilicon or other suitable material and which are also heated to between 400 and 450 degrees C. The vapors of ammonium chloride finally enter at the bottom and beneath the ammonium bisulphate in the chamber 22 of the retort 13 and are broken up into small bubbles or atomized by being passed thru the perforations in the concave plate 27 which is composed of the same durable material. As the bubbles of ammonium chloride vapor ascend, they interact with the fused bisulphate while the entire mass is being stirred by means of suitable agitator worms 24, 25, 37, 38, and 39. The reaction which takes place, when the vapor ammonium chloride maintained at a temperature of 400 to 450 degrees C., bubbles thru the mass of fused bisulphate which until now has been heated to attain a temperature of 160 to 170 degrees C., results in the absorption by the bisulphate mass, of a certain amount of ammonia from the vapors, and in the liberation of a proportionate amount of hydrochloric acid together with unacted-upon ammonium chloride vapors.

The temperature of the mass of sulphate, at that stage consisting both of the normal sulphate formed and the residual bisulphate remaining as yet unacted upon, rises above the initial temperature given the mass, that is, above 160 and 170 degrees C., as the hot ammonium chloride vapors come in contact with it. It is therefore no longer necessary to heat the bisulphate mass in order to keep it between 160 and 170 degrees C., and also to avoid the formation of sulphur dioxide gas, if with the continuation of the passage of vapor ammonium chloride at 400 to 450 degrees C., the temperature of the bisulphate mass tends to rise above 200 degrees C., a cooling current of air is then passed around the retort 13 by feeding a current of air thru the branch pipe 19 from the pipe 18 into the chamber 20 enveloping the lower portion of the retort 13, the current passing out of this chamber 20 thru the pipe line 34. A cooling current of air is also passed thru the circulating pipes 23 which enter directly into the chamber 22 of the retort and extend diametrically across the latter member. The cooling current of air is passed thru the circulating pipes 23 which encompass the worms to accomplish the latter in order to cool the mass to the proper or desired temperature which is about 200 degrees C.

The resultant mixture of gaseous ammonium chloride and hydrochloric acid which is present in quantity proportionate to the amount of ammonia absorbed by the bisulphate passes off as bubbles and floats upwardly thru the reacting mass of bisulphate and fills the space above the bisulphate in the chamber 22 of the retort 13. The ammonium chloride vapors are prevented from condensing on the walls of the retort 13, limiting the space by keeping the upper portion or half of the walls of the retort 13 at 300 to 350 degrees C. with currents of flue gas delivered from the furnace or heat producing means utilized beneath the retort 10 thru the conduit 45 which enter into the chamber 47 thru communicating elements joining the flue 45 to the housing 17. This gaseous mixture of ammonium chloride, and hydrochloric acid, the latter proportionate to the amount of ammonia absorbed by the bisulphate, is drawn thru a delivery pipe 43 after the plunger 44 has been lifted to uncover the opening of this delivery pipe in which the temperature is finally permitted to drop to 110 or 120 degrees C. By the time this temperature is reached, all the ammonium chloride vapor in the mixture has condensed to ammonium chloride fume. This fume, together with the excess hydrochloric acid proportionate in amount to $NH_3$ (ammonia) absorbed by the bisulphate mass is now drawn at this temperature, 110 to 120 degrees C., thru any type of ordinary dust separator plant such as a low capacity Baldwin separator or a Cottrell precipitation plant, or thru a dust separating bag house, or dust chamber, or otherwise treated for the separation of the ammonium chloride fume from the hydrochloric acid. The hydrochloric acid, which is gaseous at this temperature of 110 to 120 degrees C. is permitted to pass by valve control from the dust separating plant after it has been freed from ammonium chloride fumes to any ordinary hydrochloric acid condensing apparatus where the hydrochloric acid is condensed and may be utilized in any desirable manner.

When the reacting bisulphate mass has absorbed all of the ammonia it can from the ammonium chloride vapors and absorbs no more or very little, then no more or a proportionately small quantity of hydrochloric acid is formed and mixed in the vapor ammonium chloride which also increases proportionately as the hydrochloric acid decreases. As the vapor ammonium chloride is condensed to fumes and precipitated in the dust separation plant, it leaves at this stage no hydrochloric acid or a very small quantity to pass into the hydrochloric acid condenser so that if the increase in bulk in the droppings of ammonium chloride at the dust separation plant does not indicate the point at which the bisulphate is saturated with ammonia and no longer absorbs ammonia from the vapor ammonium chloride, then the condensed product at the end of the hydrochloric acid condenser will do so by reason of its meager content of hydrogen chloride.

When this stage of the process has been reached, that is, when the bisulphate absorbs no more ammonia from the ammonium chloride vapors, then the generation of the ammonium chloride vapors is stopped, which is accomplished by introducing no more solid ammonium chloride into the zinc chloride in retort 10 or otherwise their passage is deviated to another reacting mass of bisulphate, thereby making one ammonium chloride chamber such as retort 10 the source of supply of ammonium chloride vapors for several bisulphate chambers that may be operated in series. A rapid current of air (carbon dioxide free) may now be passed, if necessary, into the space above the bisulphate mass, which at this point consists of about 75 to 80% neutral sulphate in order to drive out any hydrochloric acid that may remain in that space, and thru the precipitation plant, thence into the hydrochloric acid condenser. When this is done, the hydrochloric acid condensing apparatus is shut off or disconnected from the dust separating plant and the latter is connected or opened by a valve to any ordinary ammonia condensing apparatus. Superheated steam, previously heated to about 400 to 450 degrees C. is then passed by way of the pipe 35 and branch pipes 36 thru the reacting mass in the bisulphate chamber 13, when under this condition, the neutral ammonium sulphate present in the mass liberates ammonia and is reconverted into the original bisulphate which is again used for the formation of the neutral ammonium sulphate in the repetition of the process. The ammonia thus liberated upon passage of the superheated steam is led in a similar manner to that of the hydrochloric acid, thru the dust separating plant where the ammonia which is mixed with the fumes of ammonium chloride is there freed from the latter and passed thru the ammonia condenser. In the condenser, it is condensed to any concentration and may be used in any convenient manner. The fumes of ammonium chloride, here mentioned, that are formed as a result of the action of the heat carried by the superheated steam upon any residual solid ammonium chloride that may have been condensed in the bisulphate chamber 13 during the first step of the process, that is, during the passage of vapor ammonium chloride thru the fused ammonium bisulphate. To avoid the formation of sulphites, if upon the passage of the superheated steam, at 400 to 450 degrees C., the temperature of the reacting mass in the bisulphate chamber 13 tends to rise above 300 to 330 degrees C., then the counter current of steam at a temperature between 100 to 250 degrees C. as necessary, is passed thru the pipes 33 at such a rate as to maintain the temperature of the mass at the desired temperature. To aid in the maintenance of this temperature level of the reacting mass, the worms in the retort 13 are in continuous operation and a cooling current of air is passed if necessary about the portion of the retort 13 holding the reacting mass, that is, in space 20 between the double wall of the base of the chamber and also thru the hollow pipes 13 that accompany and envelop the worms.

I claim:—

1. A process of obtaining hydrochloric acid and ammonia from solid ammonium chloride which consists in vaporizing the ammonium chloride, passing the vapors at an elevated temperature thru ammonium bisulphate fused in a closed chamber or retort made of refractory material refractory to the chemicals employed, collecting the hydrochloric acid thereby formed, passing a rapid current of carbon dioxide free air into the space above the reacting bisulphate mass to drive out the residual hydrochloric acid, then passing thru the bisulphate mass previously acted upon by the ammonium chloride vapor and maintained at a suitable temperature, superheated steam whereby ammonia is obtained.

2. A process of obtaining hydrochloric acid from ammonium chloride which consists in bringing the vapor of ammonium chloride into contact with ammonium bisulphate at an elevated temperature until the bisulphate is sufficiently ammoniated, and then passing into the chamber holding this mass steam at a suitable temperature to obtain ammonia.

3. An improvement in the process of obtaining ammonia from ammonium chloride which consists in passing vapor of ammonium chloride at an elevated temperature thru fused alkali metal bisulphates and passing steam thru the residual mass to obtain ammonia.

4. An improvement in the process of obtaining ammonia from ammonium chloride which consists in fusing ammonium bisulphate in a chamber and bringing it in contact with ammonium chloride vapor at an elevated temperature, drawing off the resulting hydrogen chloride and passing steam previously heated to the temperature of 400° C. to 450° C., through the residual mass while the bisulphate used is maintained at 200 degrees C. or over.

5. A process of obtaining hydrochloric acid and ammonia successively from ammonium chloride which consists in passing successively vapor of ammonium chloride and superheated steam thru one and the same retort, having contained therein ammonium bisulphate fused and maintained at suitable temperature and repeating the process continuously so as to use the same fused material repeatedly without handling it.

6. The improvement in the process of obtaining hydrochloric acid and ammonia successively which comprises passing ammonium chloride thru a vessel or chamber containing ammonium bisulphate and then driving out the residual hydrochloric acid by means of a rapid current of carbon dioxide free air passed about the previously acted-upon bisulphate mass, and collecting the same before blowing in steam whereby all the hydrochloric acid is saved instead of being partially wasted as it would be if the steam were admitted before passage of air.

7. The improvement in obtaining ammonia from ammonium chloride by means of ammonium bisulphate which consists in treating the neutral sulphate formed by the action of vapor of ammonium chloride on the bisulphates named, with steam previously heated to an elevated temperature so as to reduce as much as possible the supply of heat thru the walls of the apparatus.

8. The improvement of obtaining ammonia from ammonium chloride by means of ammonium bisulphate which consists in treating the neutral sulphate formed by the action of vapor of ammonium chloride on the bisulphates named with steam previously heated to 400 or 450 degrees C., and in maintaining the temperature of the neutral sulphate formed during the passing of steam, as near 300 to 330 degrees C. as possible by the methods described.

In testimony whereof I affix my signature.

JACOB KESSLER.